United States Patent
Rueger et al.

(10) Patent No.: US 10,344,145 B2
(45) Date of Patent: Jul. 9, 2019

(54) LASER-MARKABLE AND LASER-WELDABLE POLYMERIC MATERIALS

(71) Applicant: Merck Patent GmbH, Darmstadt (DE)

(72) Inventors: Reinhold Rueger, Roedermark (DE); Ulrich Quittmann, Floersheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/524,451

(22) PCT Filed: Oct. 15, 2015

(86) PCT No.: PCT/EP2015/002032
§ 371 (c)(1),
(2) Date: May 4, 2017

(87) PCT Pub. No.: WO2016/070954
PCT Pub. Date: May 12, 2016

(65) Prior Publication Data
US 2018/0273730 A1    Sep. 27, 2018

(30) Foreign Application Priority Data
Nov. 5, 2014    (DE) .......... 10 2014 016 286

(51) Int. Cl.

| | | |
|---|---|---|
| *C08K 9/02* | (2006.01) | |
| *C08K 3/013* | (2018.01) | |
| *B41M 5/26* | (2006.01) | |
| *C08K 3/22* | (2006.01) | |
| *C08J 3/22* | (2006.01) | |
| *B29C 65/14* | (2006.01) | |
| *B29K 105/00* | (2006.01) | |
| *B29K 509/02* | (2006.01) | |

(52) U.S. Cl.
CPC .............. *C08K 9/02* (2013.01); *B41M 5/267* (2013.01); *C08J 3/226* (2013.01); *C08K 3/013* (2018.01); *C08K 3/22* (2013.01); *B29C 65/1477* (2013.01); *B29K 2105/0032* (2013.01); *B29K 2509/02* (2013.01); *C08K 2003/2231* (2013.01); *C08K 2201/003* (2013.01); *C08K 2201/005* (2013.01); *C08K 2201/006* (2013.01)

(58) Field of Classification Search
CPC . C08K 9/02; C08K 3/013; C08K 3/22; C08K 2003/2231; C08K 2201/003; C08K 2201/005; C08K 2201/006; B41M 5/267; C08J 3/226; B29C 65/1477; B29K 2105/0032; B29K 2509/02
USPC ........................................................ 524/410
See application file for complete search history.

(56) References Cited

U.S. PATENT DOCUMENTS

| | | | |
|---|---|---|---|
| 6,214,917 B1 * | 4/2001 | Linzmeier | B41M 5/267 106/415 |
| 6,693,657 B2 | 2/2004 | Carroll et al. | |
| 2002/0171732 A1 | 11/2002 | Carroll et al. | |
| 2006/0216441 A1 | 9/2006 | Schubel | |
| 2006/0281846 A1 * | 12/2006 | Hager | B29C 65/1635 524/430 |
| 2007/0173581 A1 | 7/2007 | Hager et al. | |
| 2008/0107880 A1 * | 5/2008 | Kliesch | B32B 27/20 428/212 |

FOREIGN PATENT DOCUMENTS

| | | |
|---|---|---|
| DE | 202004016363 U1 | 3/2006 |
| DE | 102005011180 A1 | 9/2006 |
| EP | 1720712 A1 | 11/2006 |
| WO | 02083567 A2 | 10/2002 |
| WO | 2005084955 A1 | 9/2005 |

OTHER PUBLICATIONS

Pfaff, Special Effect Pigments, Vincentz Network, 2008. (Year: 2008).*
Written Opinion for PCT/EP2015/002032 dated May 18, 2017.
International Search Report dated Dec. 22, 2015 issued in corresponding PCT/EP2015/002032, 3 pages.
English translation Abstract of DE102005011180A1 published Sep. 14, 2006 (2 pages).
English translation Abstract of WO2005084955A1 published Sep. 15, 2005 (2 pages).
English translation Abstract of DE202004016363U1 published Mar. 2, 2006 (1 page).
Search Report for corresponding CN application 201580060221.0 dated Mar. 13, 2019 (pp. 1-7).

* cited by examiner

*Primary Examiner* — Hui H Chin
(74) *Attorney, Agent, or Firm* — Millen White Zelano and Branigan, PC; Csaba Henter

(57) ABSTRACT

The present invention relates to colored laser-markable and laser-weldable polymeric materials which are distinguished by the fact that they comprise, as absorber, at least one doped tin oxide or indium oxide having a large specific surface area.

18 Claims, No Drawings

LASER-MARKABLE AND LASER-WELDABLE POLYMERIC MATERIALS

The present invention relates to coloured laser-markable and laser-weldable polymeric materials which are distinguished by the fact that they comprise at least one doped tin oxide or indium oxide having a large specific surface area as absorber.

The labelling of manufactured goods is becoming increasingly important in virtually all branches of industry. Thus, for example, dates of manufacture, batch numbers, expiry dates, barcodes, 2D codes, company logos and serial numbers frequently have to be applied to plastic parts. Of increasing importance in this connection is contactless, very rapid and flexible marking using lasers. Using this technology it is possible to apply inscriptions at high spee, even to a non-planar surface. Since the inscription is located within the plastic body itself, it is permanently resistant to abrasion.

Since many plastics are transparent to laser light, laser-sensitive agents which, as a result of absorption of the laser energy in the plastic material either directly as a result of interaction with the polymer or indirectly with the added material, cause a local, highly visible discoloration, are usually added to the plastics. The laser-sensitive agent can be an organic dye or a pigment which absorbs the laser light. Various causes may be given for the discoloration, for example, the decomposition of the polymer or the absorber itself is converted from an invisible form to a visible form. A darkening in the colour of the plastic generally occurs due to carbonisation as a consequence of the laser energy introduced.

Numerous additives are known for the laser marking of plastics. Suitable materials for marking using Nd-YAG lasers (neodymium-doped yttrium aluminium garnet lasers), $YVO_4$ lasers (yttrium vanadate lasers) and 1064 nm fibre lasers are preferably those which absorb light of wavelength 1064 nm and themselves have only a slight intrinsic colour. Examples are copper phosphates, bismuth oxide, bismuth oxychloride, antimony-doped tin oxide on mica or metals. EP 1 377 522 A2 describes additives for the laser marking of plastics which consist of calcined antimony/tin mixed oxide in which the antimony concentration at the surface is greater than that in the particles as a whole. The particle size is 0.1-10 µm, preferably 0.5-5 µm. With the additive, dark markings on pale backgrounds are obtained. Pale markings are not obtained.

EP 1 720 712 A1 describes highly transparent laser-markable and laser-weldable plastic materials which comprise doped tin oxides, antimony oxides or indium oxides having a particle size of 1-100 nm and whose transparency is greater than 85% at a thickness of 2 mm and exhibit less than 3% haze. EP 1 720 712 A1 teaches that a dark marking against a pale background and high contrast are desired in laser marking. The markings obtained are dark. The patent application furthermore states that transparent plastic articles cannot be produced with pigments comprising relatively large particles or aggregated particles comprising primary particles smaller than 80 µm.

However, dark markings can only be seen with difficulty on coloured or darkly coloured plastic parts. Examples of dark or coloured plastic parts are cable insulations, keyboards or darkly coloured plastic pipes. A pale, as far as possible white, inscription is desired here since this appears significantly higher in contrast than a grey or black marking against the dark back-ground. Pale markings can be produced by foaming plastics by means of laser irradiation. However, this is limited to a few polymer types and leads to a considerable change in the surface as a result of the foam formation. The mechanical strength of the surface is thereby reduced.

WO 2011/085779 A1 describes materials and a process for the production of a pale laser marking. The process uses particles which consist of a white core and a preferably black or grey shell which can be decoloured by laser irradiation. The dark shell contains carbon, for example, as carbon black.

The materials described in WO 2011/085779 A1 have the disadvantage that they are dark grey to black and therefore considerably restrict the colour design of the plastic parts. In particular, red, brown, blue and green shades are only feasible to a limited extent, if at all.

There therefore continues to be a need for laser additives which lead, particularly on coloured or dark substrates as a result of laser bombardment, to a pale to white marking which is retained over a long period, even under mechanical stress.

It is therefore an object of the present invention to find a process for the production of high-contrast and mechanically stable pale markings on coloured or dark plastic objects. A further object of the invention is the provision of a laser additive which has only a slight intrinsic colour, or none at all, and, under the action of laser light, produces very good marking results in the polymer doped therewith, in particular high-contrast, in particular sharp and pale markings, on a coloured or dark background and can be used in a broad range of plastics.

It is a further object of the present invention to provide a process for the preparation of such a laser additive.

Surprisingly, it has been found that brightly or darkly coloured plastic articles can be provided with a pale marking by irradiation with laser light if the coloured plastic comprises a doped tin oxide (for example FTO, ATO) or indium tin oxide (ITO) having a large specific surface area in low concentration.

The invention thus relates to a laser-markable polymeric material, characterised in that the polymer comprises a colorant and, as absorber, a doped tin oxide or indium tin oxide (ITO) having a specific surface area (BET, $N_2$ absorption) of at least 15 $m^2/g$.

An essential factor for the action of the laser additive in the direction of a pale marking, besides doping, is the specific surface area of the particles. Pale markings having good contrast are obtained if the particles have a specific surface area of at least 15 $m^2/g$, preferably 20 $m^2/g$ or more. Particular preference is given to particles having a specific surface area of at least 25 $m^2/g$. Besides the laser additive, the plastic also comprises one or more colorants. Without a colorant, the plastic is pale and transparent to opaque. Although pale markings are also obtained without colorants in the presence of the pigments according to the invention and on use of suitable exposure parameters, these are, however, difficult to see owing to the low contrast against the background and are of little relevance for practical use.

Preferred colorants for the colouring of plastics are those which themselves absorb only little or preferably no light at all at the wavelength of the laser light. Suitable colorants are, in particular, organic dyes and pigments, which are available in large number to the person skilled in the art.

The laser pigments according to the invention having a large specific surface area may in the simplest case consist of nanoscale particles (<100 nm) having a correspondingly large specific surface area, but the pigments according to the invention preferably consist of larger porous aggregates of primary particles, which may be nanoscale. On incorporation into a plastic, some of the aggregates are comminuted by the shear forces, but not down to the primary particles. On incorporation into surface coatings or casting resins, the particles are subjected to lower shear forces and the particle size of the aggregates remains essentially unchanged.

For the generation of a pale marking, however, it is not the particle size of the particles that is crucial, but instead the specific surface area of the particles is the crucial feature for the formation of a pale marking on laser bombardment. In the case of particles having a large surface area, the amount of energy absorbed from the laser light in relation to the surface area of the particle is too low for carbonisation of the polymer matrix around the particles. Gassing-out of volatile substances from the pores on laser bombardment is also of importance for the formation of pale markings with porous particles.

However, the particle size of the pigments is an important parameter for the edge sharpness of the laser marking. Edge-sharp markings are obtained if the weight average particle size of the pigments is 10 µm or less, preferably 5 µm or less and particularly preferably 2 µm or less, measured at the $D_{90}$ by means of laser diffraction. The particles are porous and consist of aggregates of primary particles having a diameter of less than 100 nm, preferably a diameter of less than 50 nm. However, unaggregated or only slightly aggregated particles having a specific surface area of 15 $m^2/g$ or more are also suitable for pale laser markings. However, the aggregated particles having particle sizes above 100 nm, preferably above 500 nm, measured at the $D_{90}$ by means of laser diffraction, are preferred for technical reasons associated with processing.

The use concentration of the pigment for pale laser marking is 0.005-1%, based on the plastic, preferably 0.05-0.5%. Owing to the low inherent colour of the pigments, the colouristic properties of the plastic articles are impaired insignificantly or only to a small extent by the additive.

Under the action of laser light, the doped polymer exhibits a pale marking with high contrast and pronounced edge sharpness. The foaming which occurs in other processes for pale marking and the associated roughening of the surface is not observed.

Besides the excellent optical properties, contrast and edge sharpness, the laser additives according to the invention enable rapid markings with high pulse rates and have a large process window, based on the laser settings.

In addition, the brightness of the marking can be controlled specifically down to dark markings by adjustment of the laser parameters. Highly detailed coloured half-tone images are accessible merely via control of the laser parameters (power, exposure duration, focus). The invention likewise relates to the method for image generation.

Preferred laser additives are support-free antimony-doped tin oxide, fluoride-doped tin oxide and indium tin oxide. The content of dopants in the tin oxide is 1-15 mol %, preferably 3-10 mol %. The indium tin oxide contains 5-15 mol % of tin.

The laser pigments according to the invention can be obtained as a finely divided powder of large specific surface area and having particle sizes of 10 µm or less even during production by means of suitable process parameters. However, it is also possible to grind larger particles or larger aggregates down to the desired particle size with the aid of suitable mills, for example air jet mills and/or bead mills. The preferred grinding process for extremely fine grinding is the bead mill.

The grinding can be carried out under dry conditions as powder grinding or, for example, in aqueous suspension in the presence of dispersion aids. In this way, approximately 50% aqueous suspensions of the pigments are accessible. Spray drying or freeze drying allows the isolation of finely divided powders having a large specific surface area.

Alternatively, the preparation of a hydrophobic preparation of the pigments according to the invention is possible with the aid of suitable solvents and/or protective colloids, for example by grinding in mineral oil or paraffin. The hydrophobic, paste-form or solid preparation obtained can then be redispersed in solvents or, in the form of chips, incorporated directly into the plastic.

Owing to the low use concentrations of the pigments according to the invention in the plastic preparations, it is advantageous for meterability firstly to prepare a highly dilute preparation of the pigments. To this end, the pigments are preferably extended with an inert substance which has no intrinsic colour and is compatible with the plastics. Suitable diluents are, for example, precipitated silicic acids or fumed silicic acids or inorganic fillers, such as, for example, talc, kaolin or mica. The substances can be added before the fine grinding or afterwards.

In another advantageous embodiment, a masterbatch of the plastic having a relatively high concentration of the pigment is firstly prepared and this is then added in a small amount as granules to the main composition of the plastic during processing of the plastic.

Furthermore, colorants may be added to the polymers, allowing a broad colour variation, particularly in the colours red, green and blue. Suitable colorants are in particular organic pigments and dyes. The presence of a colourant is essential for the visibility of the pale marking.

Suitable polymeric materials which can be used for laser marking are, in particular, all known plastics, in particular thermoplastics, furthermore thermosets and elastomers, as described, for example, in Ullmann, Vol. 15, p. 457 ff., Verlag VCH. Suitable thermoplastic polymers are, for example, polyethylene, polypropylene, polyamides, polyesters, polyether esters, polyphenylene ethers, polyacetal, polybutylene terephthalate (PBT), polyethylene terephthalate (PET), polymethyl methacrylate, polyvinyl acetal, polystyrene, acrylonitrile-butadiene-styrene (ABS), acrylonitrile-styrene-acrylate (ASA), styrene-acrylonitrile (SAN), polycarbonate, polyether sulfones and polyether ketones, and their copolymers and/or mixtures, and/or polymer blends, such as, for example, PC/ABS, MABS.

Suitable thermosetting polymers are, for example, polyurethane, melamine resins, polyesters and epoxy resins.

The incorporation of the laser pigments according to the invention can take place, for example, by compounding, via a masterbatch, via pastes or by direct addition during the shaping processing step (direct pigmentation). Further additives, such as, for example, processing aids, stabilisers, flame retardants, fillers and colour-imparting pigments, can optionally be added to the polymer, preferably plastic granules, during the incorporation of the absorber. The laboratory preparation of the doped plastic granules is generally carried out by initially introducing the plastic granules in a suitable mixer, wetting them with dispersion aids and then adding and incorporating the absorber and the coloured pigments required. In industrial practice, the colouring of and addition of additives to the polymer is usually carried out via a colour concentrate (masterbatch) or compound. For this purpose, coloured pigments and additives are dispersed in the molten plastic with high shear in extruders (usually co-rotating twin-screw extruders). The plastic melt exits through a perforated plate on the extruder head and is converted into granules by means of suitable downstream devices (for example strand pelletising processes or underwater granulation). The granules thus obtained can be further processed directly in an extruder or injection moulding machine. The mouldings formed during the processing exhibit very homogeneous distribution of the absorber. Subsequently, the laser marking is carried out using a suitable laser.

The invention also relates to a process for the preparation of the doped polymeric materials according to the invention, characterised in that a polymeric material is mixed with the absorber and then shaped under the action of heat.

Besides the excellent optical properties, contrast and edge sharpness, the finely divided laser additive according to the invention allows rapid marking with high pulse rates and provides a large processing window based on the laser settings. By adjusting the laser parameters it is moreover possible to control, in a targeted manner, the paleness of the marking ranging to dark markings. Merely by controlling the laser parameters, detail-rich half-tone images are accessible. The invention likewise relates to the process of generating images.

The inscription of the polymer using the laser is carried out by bringing the specimen into the ray path of a pulsed laser, preferably an Nd:YAG laser, $YVO_4$ laser or 1064 nm fibre laser. Furthermore, inscription using an excimer laser, for example via a masking technique, is possible. However, the desired results can also be achieved using other conventional types of laser which have a wavelength in a region of high absorption of the pigment used. The marking obtained is determined by the irradiation time (or pulse count in the case of pulsed lasers) and irradiation power of the laser and also by the plastic system used. The power of the laser used depends on the particular application and can readily be determined by the person skilled in the art on a case by case basis.

The laser used generally has a wavelength in the range from 157 nm to 10.6 μm, preferably in the range from 532 nm to 10.6 μm. Mention may be made here, for example, of $CO_2$ lasers (10.6 μm) and Nd:YAG lasers (1064 or 532 nm) or pulsed UV lasers. The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG lasers having wavelengths of 355 nm (frequency-tripled) or 265 nm (frequency-quadrupled). Particular preference is given to using Nd:YAG lasers (1064 or 532 nm), $YVO_4$ lasers, 1064 nm fibre lasers or $CO_2$ lasers. The energy densities of the lasers used are generally in the range from 0.3 $mJ/cm^2$ to 50 $J/cm^2$, preferably 0.3 $mJ/cm^2$ to 10 $J/cm^2$. When using pulsed lasers, the pulse frequency is generally in the range from 1 to 30 kHz. Corresponding lasers which can be used in the process according to the invention are commercially available.

The laser welding is carried out by welding a laser-transparent material to a laser-absorbing material. As laser-absorbing material, the laser additive according to the invention can be added in concentrations of 0.001 to 10% by weight, preferably 0.001 to 7% by weight and in particular 0.01 to 3% by weight, based on the polymer. Suitable lasers for laser welding are preferably CW diode lasers or Nd:YAG lasers at wavelengths of 800-1100 nm, preferably 808-1080 nm. The energy densities of the lasers used are generally in the range from 0.3 $mJ/cm^2$ to 200 $J/cm^2$, preferably 0.5 $J/cm^2$ to 150 $J/cm^2$.

The coloured polymer doped in accordance with the invention can be used in all fields where conventional welding processes or printing processes have hitherto been used for the inscription or joining of plastics. For example, moulding compositions, semi-finished products and finished parts made from the polymer according to the invention can be used in the electrical, electronics and automotive industry. The labelling and inscription of, for example, cables, pipes, decorative strips or functional parts in the heating, ventilation and cooling sector or switches, plugs, levers and handles which consist of the polymer doped in accordance with the invention can be carried out with the aid of laser light even in places that are difficult to access. Furthermore, the polymer system according to the invention can be used in packaging in the food sector or in the toy sector. The markings on the packaging are distinguished by the fact that they are wipe- and scratch-resistant, stable during subsequent sterilisation processes, and can be applied in a hygienically pure manner during the marking process. Complete label images can be applied permanently to the packaging for a reusable system. Furthermore, the polymer system according to the invention is used in medical technology, for example in the marking von Petri dishes, microtitre plates, disposable syringes, ampoules, sample containers, supply tubes and medical collecting bags or storage bags.

A further important area of application for laser inscription are plastic tags for the individual labelling of animals, so-called animal ear tags, and of products, so-called security seals. A barcode system is used to store the information which specifically belongs to the animal or product. This can be read off as required with the aid of a scanner. The inscription must be very durable since the ear tags sometimes remain on the animals for a number of years.

The laser marking of moulding compositions, semi-finished products and finished parts which consist of the polymer according to the invention is thus possible.

The following examples are intended to explain the invention, but without limiting it. The percentages indicated are percent by weight. In the application, the specific surface area (BET surface area by nitrogen adsorption) of the laser additives according to the invention is determined using the Micrometrics ASAP 2420 instrument.

All $D_{10}$, $D_{50}$ and $D_{90}$ values in this application are determined by means of laser diffraction using the Malvern Mastersizer 2000 instrument.

EXAMPLES

Example 1: Antimony-Doped Tin Oxide Having a Large Specific Surface Area

A mixture of 446 g of a 50% by weight aqueous $SnCl_4$ solution, 135 ml of HCl (37% by weight), 96.5 g of a 35% by weight aqueous $SbCl_3$ solution is metered continuously to the suspension over the course of 90 min into 1.5 liters of initially introduced dilute hydrochloric acid in a stirred reactor at 60° C. with vigorous stirring. The pH is kept constant at pH 2 by simultaneous metered addition of sodium hydroxide solution. After addition of the entire amount of the solution, the mixture is stirred at 60° C. for a further 30 min, subsequently cooled to room temperature with stirring, and the pigment obtained is filtered off via a suction filter, washed with water, dried at 140° C. and calcined at 700° C. under air for 30 min. A grey pigment powder is obtained. The Sn:Sb ratio in the coating is about 92:8. The X-ray diffraction pattern of the pigment shows only cassiterite. The pigment powder is ground in a planetary ball mill with zirconium balls and sieved. The particle size distribution is measured by means of laser diffraction in a Malvern Mastersizer 2000. The product has a volume average $D_{90}$ of 9.1 µm and a $D_{10}$ of 1.8 µm. The BET surface area of the pigment is determined by nitrogen adsorption using a Micrometrics ASAP 2420 instrument. The specific surface area (BET) is 52 m$^2$/g.

Example 2: Antimony-Doped Tin Oxide Having a Moderate Specific Surface Area

A pigment is prepared by modifying the procedure from Example 1 in the parameters temperature and metering rate of the starting materials. At a temperature of 80° C. and with metering of the starting materials over 6 hours, a pigment having a specific surface area of 17 m$^2$/g is obtained.

Example 3: Antimony-Doped Tin Oxide Having a Large Specific Surface Area

A mixture of 465 g of a 50% by weight aqueous SnCl$_4$ solution, 135 ml of HCl (37% by weight), 48.2 g of a 35% by weight aqueous SbCl$_3$ solution is metered to the suspension over the course of 90 min at pH 1.6 into 1.5 liters of initially introduced dilute hydrochloric acid in a stirred reactor at 40° C. with vigorous stirring. After addition of the entire amount of the solution, the mixture is stirred at 40° C. for a further 30 min, subsequently cooled with stirring, and the pigment obtained is filtered off via a suction filter, washed with water, dried at 140° C. and calcined at 700° C. under air for 30 min. A blue-grey pigment powder is obtained. The Sn:Sb ratio in the coating is about 96:4. The pigment powder is ground in a ball mill and then sieved. The particle size distribution is measured by means of laser diffraction (Malvern Mastersizer 2000). The product has a volume average $D_{90}$ of 7.4 µm and a $D_{10}$ of 0.9 µm, the specific surface area (BET) is 38 m$^2$/g. Under a scanning electron microscope, strongly aggregated particles having primary particles with a size of 30-40 nm are evident.

Example 4: ITO Pigment 20 g of yellow ITO nanopowder from Nanoni Materials&Technology is calcined at 450° C. under forming gas (5% of H$_2$) in a tubular oven for 45 min, subsequently ground and sieved. A blue-grey powder having a BET surface area of 25 m$^2$/g and a particle size of the aggregates of 8 µm ($D_{90}$) is obtained. The primary particles are <50 nm (SEM).

Example 5: Comparative Example

A mixture of 110 ml of hydrochloric acid (37% of HCl), 357.7 g of SnCl$_2$ solution (49% by weight of SnCl$_2$) and 52.1 g of SbCl$_3$ solution (35% by weight) and 130 g of a 30% hydrogen peroxide solution is metered over the course of 8 hours into 1.5 liters of initially introduced dilute hydrochloric acid in a stirred reactor at 80° C. with vigorous stirring. After addition of the entire amount of the solution, the mixture is stirred for a further 30 min, subsequently cooled to room temperature with stirring, and the reaction mixture is adjusted to pH 3. The pigment obtained is filtered off via a suction filter, washed with water, dried at 140° C. and calcined at 800° C. under air for 30 min. A grey pigment powder is obtained. The Sn:Sb ratio in the coating is about 92:8. The X-ray diffraction pattern of the pigment shows only cassiterite. The pigment powder is ground in a planetary ball mill with zirconium balls and sieved. The product has a volume average $D_{90}$ of 8.3 µm, the specific surface area (BET) is 11.8 m$^2$/g.

Example 6

1 kg of PP granules (Metocene 648T, Basell) is wetted with 2 g of dispersion aid (Process-Aid 24, Colormatrix) in a drum mixer. 5 g of the pigment from Example 1 and 1 g of organic green coloured pigment (PV Fast Green GG01, Clariant) are added and incorporated for 2 min in the drum mixer. The resulting mixture is compounded in a co-rotating twin-screw extruder with high shear at a jacket temperature of 250-260° C., extruded through a pelletising die, cooled in a water bath and granulated by means of a rotating blade. The compound obtained is dried at 100° C. for 1 h and converted into plates measuring 60 mm×90 mm×1.5 mm (w×h×d) in an injection moulding machine. The plastic plates are then laser-marked using a pulsed YVO$_4$ laser having a wavelength of 1064 nm and a maximum output power of 10.5 W. The test grid varies the speed between 500 and 5000 mm/s and the frequency between 20 and 100 kHz. Filled areas with a line spacing of 50 µm and also line text are lasered. Stable pale laser markings are obtained up to a speed of 3000 mm/s. The line marking is very defined with accurate detail and confirms the homogeneous distribution of the additive.

Example 7

Small plastic plates which comprise the laser pigment from Example 2 are produced using the process from Example 3. The plates are laser-treated analogously to Example 6. Stable and accurately detailed pale markings are also obtained here.

Example 8: Pale Marking with ITO 990 g of PE granules are wetted with 2 g of dispersion aid (process aid 24) in a drum mixer. 1 g of the pigment from Example 4 and 10 g of dark-brown masterbatch (Polyone 2001-BN-50 PE) are subsequently added and incorporated in the drum mixer for 2 min. The mixture obtained is compounded in a co-rotating twin-screw extruder under high shear at a jacket temperature of 250-260° C., extruded through a pelletising die, cooled in a water bath and granulated by means of a rotating blade. The compound obtained is dried at 100° C. for 1 h and converted into plates measuring 60 mm×90 mm×1.5 mm (B×H×T) in an injection-moulding machine. The red-brown plastic plates are laser-marked described analogously to Example 6. Perfect pale laser marks are also obtained here up to a speed of 3000 mm/s. The line marking is very defined with accurate detail.

Example 9: Comparative Example Without Colorant

Small plastic plates are produced by the process described in Example 6, but without addition of the green coloured pigment PV Fast Green GG01. In this way, pale opaque plastic plates are obtained. These are laser-treated as described in Example 6. When the surface is examined closely, a marking with a pale appearance can also be discerned here, but without significant contrast to the background. The marking is only discernible with difficulty and is unusable for practical use. The experiment shows that the pigment in the plastic only gives rise to a usable pale marking in combination with a colorant.

Example 10: Comparative Example—Pigment Having a Small Specific Surface Area 1 kg of PP granules (Metocene 648T, Basell) is wetted with 2 g of dispersion aid (process aid 24, Colormatrix) in a drum mixer. 5 g of the pigment from Example 5 and 1 g of organic green coloured pigment (PV Fast Green GG01) are subsequently added and incorporated in the drum mixer for 2 min. The mixture obtained is converted into plates measuring 60 mm×90 mm×1.5 mm (B×H×T) analogously to Example 6 and laser-marked.

Pale-grey to dark-grey markings are obtained up to a speed of 3000 mm/s. The dark inscriptions are difficult to see on the dark background. The result shows that ATO pigments having a specific surface area of less than 15 $m^2/g$ do not produce perfect pale markings.

The invention claimed is:

1. A laser-markable and/or laser-weldable polymer composition, said polymer composition comprising:
    a polymer, at least one colorant and, as an absorber, a doped tin oxide or indium oxide having a specific surface area of at least 15 $m^2/g$,
    wherein said absorber is in the form of porous aggregates of primary particles, and said at least one colorant is selected from organic pigments and dyes.
2. The laser-markable and/or laser-weldable polymer composition according to claim 1, wherein said absorber is at least one fluorine-doped tin oxide, antimony-doped tin oxide, or indium tin oxide.
3. The laser-markable and/or laser-weldable polymer composition according to claim 1, wherein said absorber is a doped tin oxide in which the content of dopants is 1-15 mol %, based on the tin oxide.
4. The laser-markable and/or laser-weldable polymer composition according to claim 1, wherein the porous aggregates of absorber have a number average particle size of <5 µm, measured at the $D_{90}$ by means of laser diffraction.
5. The laser-markable and/or laser-weldable polymer composition according to claim 1, wherein the primary particles have a diameter of less than 100 nm.
6. The laser-markable and/or laser-weldable polymer composition according to claim 1, wherein said absorber is employed in a concentration of 0.005 to 1% by weight, based on the polymer.
7. The laser-markable and/or laser-weldable polymer composition according to claim 1, wherein the polymer is a thermoplastic, thermoset or elastomer.
8. A process for preparation of laser-markable and/or laser-weldable polymer compositions according to claim 1, said process comprising
    adding the absorber simultaneously or successively by compounding, via a masterbatch or via pastes or by direct addition to the polymer,
    optionally adding one or more additives, and
    shaping the polymer under the action of heat.
9. A method for imaging, comprising marking a laser-markable and/or laser-weldable polymer compositions according to claim 1.
10. A molding composition, semi-finished product, or finished part comprising a laser-markable and laser-weldable polymer composition according to claim 1.
11. The laser-markable and/or laser-weldable polymer composition according to claim 1, wherein the absorber has a specific surface area of at least 20 $m^2/g$.
12. The laser-markable and/or laser-weldable polymer composition according to claim 1, wherein the absorber has a specific surface area of at least 25 $m^2/g$.
13. The laser-markable and/or laser-weldable polymer composition according to claim 1, wherein the absorber has a weight average particle size of ≤10 µm, measured at the $D_{90}$ by means of laser diffraction.
14. The laser-markable and/or laser-weldable polymer composition according to claim 1, wherein the absorber has a weight average particle size of ≤2 µm, measured at the $D_{90}$ by means of laser diffraction.
15. The laser-markable and/or laser-weldable polymer composition according to claim 1, wherein the primary particles have a diameter of less than 50 nm.
16. The laser-markable and/or laser-weldable polymer composition according to claim 6, wherein said absorber is employed in a concentration of 0.05-0.5% by weight, based on the polymer.
17. The laser-markable and/or laser-weldable polymer composition according to claim 1, wherein said absorber is a support-free antimony-doped tin oxide or a fluoride-doped tin oxide, wherein the content of dopants in the tin oxide is 1-15 mol %.
18. The laser-markable and/or laser-weldable polymer composition according to claim 1, wherein said absorber is a support-free antimony-doped tin oxide or a fluoride-doped tin oxide, wherein the content of dopants in the tin oxide is 3-10 mol %.

* * * * *